United States Patent
Qin et al.

(10) Patent No.: US 8,650,964 B2
(45) Date of Patent: Feb. 18, 2014

(54) TESTING APPARATUS

(75) Inventors: Wei-Min Qin, Wuhan (CN); Cong-Xu Hu, Wuhan (CN); Yu-Lin Liu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 51 days.

(21) Appl. No.: 13/473,679

(22) Filed: May 17, 2012

(65) Prior Publication Data

US 2013/0145860 A1 Jun. 13, 2013

(30) Foreign Application Priority Data

Dec. 7, 2011 (CN) .......................... 2011 1 0402877

(51) Int. Cl.
- *G01B 5/30* (2006.01)
- *G01B 7/16* (2006.01)
- *G01L 1/00* (2006.01)
- *G01N 3/00* (2006.01)

(52) U.S. Cl.
USPC ............................................. 73/760; 73/865.9

(58) Field of Classification Search
USPC ............................... 73/866.5, 760, 826, 865.9
See application file for complete search history.

(56) References Cited

U.S. PATENT DOCUMENTS

| | | | |
|---|---|---|---|
| 2008/0282767 A1* | 11/2008 | Ido | 73/11.01 |
| 2013/0145860 A1* | 6/2013 | Qin et al. | 73/826 |
| 2013/0167670 A1* | 7/2013 | Liu | 73/865.9 |
| 2013/0168520 A1* | 7/2013 | Liu | 248/327 |

* cited by examiner

*Primary Examiner* — Lisa Caputo
*Assistant Examiner* — Jamel Williams
(74) *Attorney, Agent, or Firm* — Altis Law Group, Inc.

(57) ABSTRACT

A testing apparatus includes a retaining panel, a screw pole, two securing panels moveably attached to the screw pole, and two mounting members. Each of the two securing panels is slidably attached to the retaining panel. Each of the two mounting member is engaged with each of the two securing panels. The two securing panels are moveable relative to the screw pole for sandwiching an electronic device, and each of the two mounting member is engaged with the screw pole, for prevent the two securing panels from disengaged from the electronic device.

15 Claims, 3 Drawing Sheets

TESTING APPARATUS

BACKGROUND

1. Technical Field

The present disclosure relates to a testing apparatus.

2. Description of Related Art

Electronic apparatus, such as computers, often need various tests, such as a vibration test or an impact test. A vibration absorbing plastic gasket is often attached to a bottom plate of the computer, for absorbing the vibration generated by the computer. The vibration absorbing plastic gasket is often tested to ensure the stability of the computer. When a vibration absorbing plastic gasket is tested, the computer is placed on a testing desk. A tension meter is engaged in a hole in a front plate of the computer, to move the computer relative to the testing desk. However, if there is no hole defined in the front plate, the tension meter cannot be engaged with the computer. Therefore, an improved testing apparatus may be needed within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
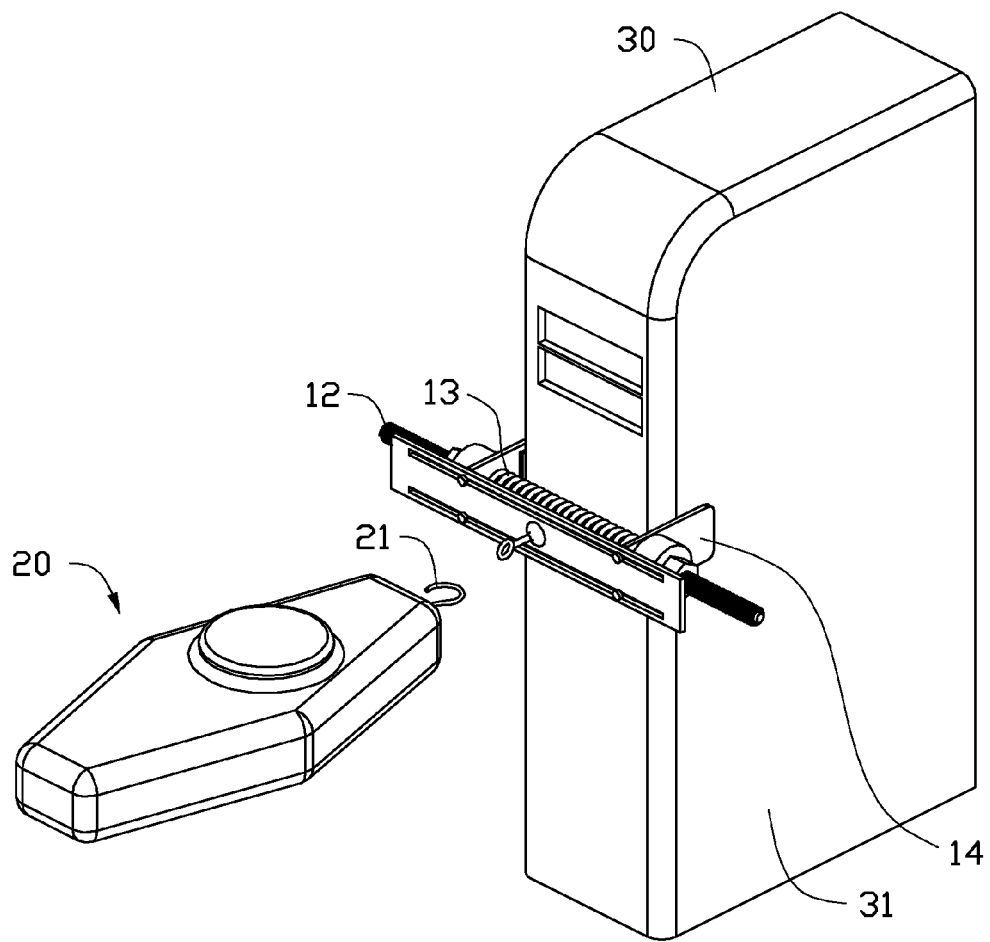
FIG. 1 is an exploded, isometric view of a testing apparatus and an electronic device in accordance with an embodiment.
Figure 2:
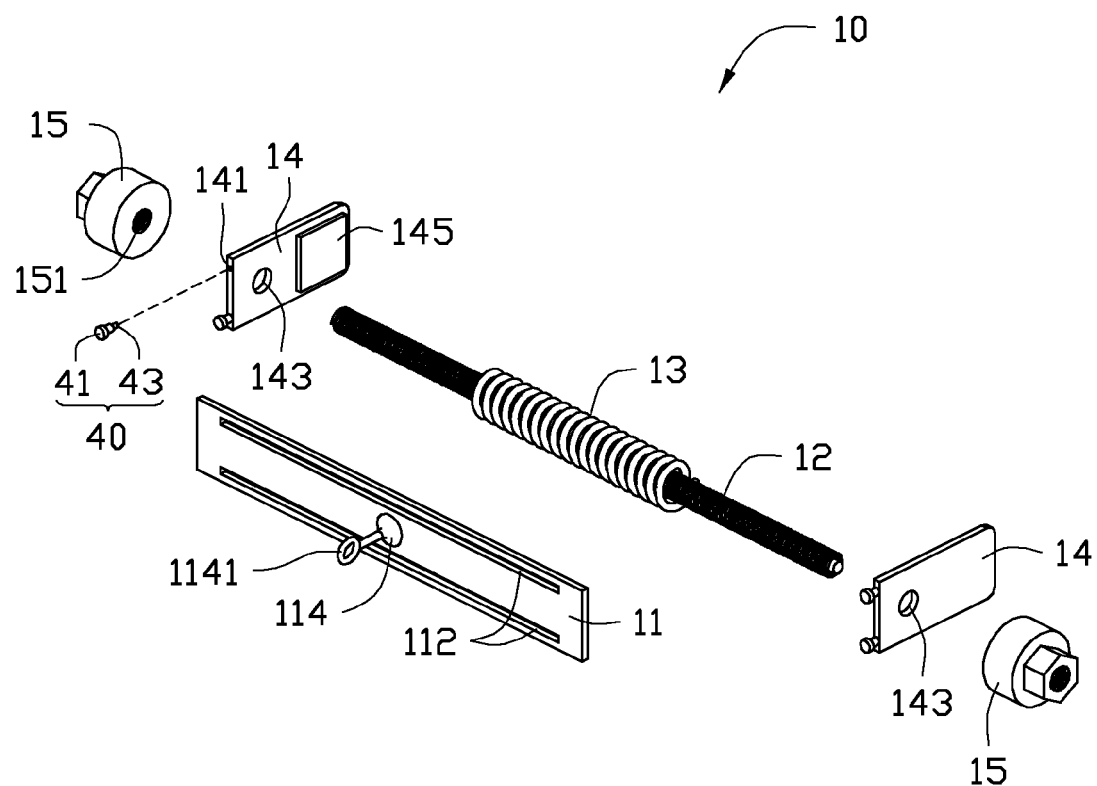
FIG. 2 is an exploded, isometric view of a securing member assembly of the testing apparatus of FIG. 1.

FIGS. 1 and 2, show a testing apparatus in accordance with an embodiment including a securing member assembly 10 and a tension meter 20. In one embodiment, the testing apparatus is used to test an electronic device 30, and the electronic device 30 may be a computer, including two opposite side plates 31.

The securing member assembly 10 includes a retaining panel 11, a screw pole 12, a resilient member 13 engaged with the screw pole 12, two securing panels 14, and two mounting members 15. The retaining panel 11 defines two transverse sliding slots 112. In one embodiment, the retaining panel 11 is a rectangle, and the two transverse sliding slots 112 are parallel to each other. A clipping portion 114, with a clipping ring 1141, is located on the center of the retaining panel 11. The clipping portion 114 is located between the two transverse sliding slots 112. In one embodiment, the clipping ring 1141 is substantially perpendicular to the retaining panel 11.

Each of the two securing panels 14 defines two fixing holes 141 and a securing hole 143. Two positioning members 40 are engaged in the two fixing holes 141, respectively. Each of the two positioning members 40 includes a head 41 and a positioning post 43 connected to the head 41. In one embodiment, a width of each of the two transverse sliding slots 112 is greater than a diameter of the positioning post 43, and is less than a diameter of the head 41. A plastic gasket 145 is attached to each of the two securing panels 14, for increasing friction between the two securing panels 14 and the two side plates 31. In one embodiment, the plastic gasket 145 is a rectangle.

Each of the two mounting members 15 defines an inner screw thread 151 corresponding to the screw pole 12. The tension meter 20 includes a hook 21 can be engaged with the clipping ring 1141.

Figure 3:
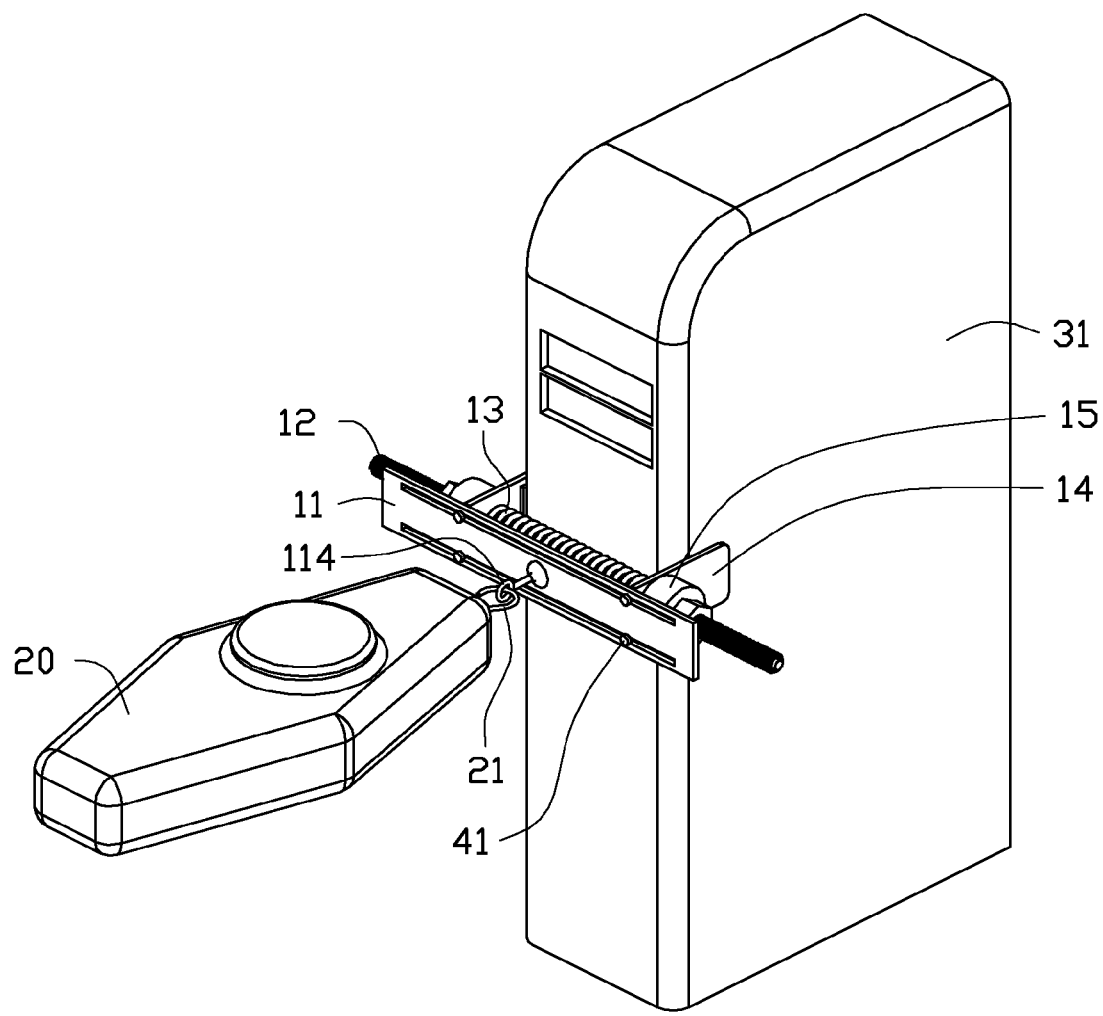
FIG. 3 is an assembled view of the testing apparatus and the electronic device of FIG. 1.

FIG. 3, shows in assembly, the two securing panels 14 are located on opposite sides of the screw pole 12. The screw pole 12 extends through the securing hole 143 of each of the two securing panels 14, the two securing panels 14 are moveable but secured to the screw pole 12, and the resilient member 13 can be located between the two securing panels 14. The two fixing holes 141 of each of the two securing panels 14 are aligned with the two transverse sliding slots 112. Each of the two positioning members 40 extends through each of the two transverse sliding slots 112 and engaged in the fixing hole 141, and the two securing panels 14 can be slidably secured to the retaining panel 11.

In use, the two securing panels 14 are moved, and the two positioning members 40 are slid in the two transverse sliding slots 112, until a distance between the two securing panels 14 is greater than a distance between the two side plates 31. The electronic device 30 is located between the two securing panels 14. The two securing panels 14 are moved towards the electronic device 30, until each of the plastic gaskets 145 are attached to the two side plates 31. The two mounting members 15 are engaged with the screw pole 12 and attached to the two securing panels 14, for preventing the two securing panels 14 from moving away from the two side plates 31. The resilient member 13 is deformed, with the two securing panels 14 being pressed on the resilient member 13. The hook 21 is engaged with the clipping ring 1141. The tension meter 20 is moved in a direction substantially perpendicular to the retaining panel 11, and the electronic device 30 is moved relative to a testing desk. Therefore, a vibration absorbing plastic gasket (not shown) attached to a bottom surface of the electronic device 30, can be tested.

A first coefficient of friction, between a plastic and a wood, is 0.6, and a second coefficient of friction, between the plastic and a steel, is 0.45. A weight of the electronic device 30 is 20 kg, and the first coefficient of friction, between a plastic vibration absorbing plastic gasket and the wood testing desk, is 0.6. Thus, a tension $F \geq Nu = 20 \times 9.8 \times 0.6 N = 117.6 N$, can pull the electronic device 30. The second coefficient of friction, between the plastic gasket 145 and each of the two side plates 31 made of steel, is 0.45, so a pressure $f \geq F/2u = 117.6N/(2 \times 0.45) = 130.7N$, and the pressure f is the each of the two mounting members 15 is pressed on the two securing panels 14. Therefore, the pressure f is greater than the tension F, and the two securing panels 14 cannot be disengaged from the two side plates 31 when the electronic device 30 is pulled.

In disassembly, the two mounting members 15 are disengaged from the two securing panels 14. The resilient member 13 is released to disengage the two securing panels 14 from the two side plates 31. Thus, the electronic device 30 can be detached from the securing member assembly 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A testing apparatus comprising:
a retaining panel; the retaining panel defines two sliding slots;
a screw pole;
two securing panels moveably attached to the screw pole, and each of the two securing panels being slidably attached to the retaining panel;
two mounting members; each of the two mounting members being engaged with each of the two securing panels; and
two positioning members; each of the two positioning members being attached to each of the two securing panels, and the two positioning members are slidably received in the two sliding slots;
wherein the two securing panels are moveable relative to the screw pole to sandwich an electronic device, and each of the two mounting members is engaged with the screw pole to prevent the two securing panels from disengaging from the electronic device.

2. The testing apparatus of claim 1, further comprising a resilient member engaged with the screw pole and located between the two securing panels, wherein the resilient member is deformed when the two securing panels are attached to the electronic device.

3. The testing apparatus of claim 1, further comprising two plastic gaskets configured to be adhered to the electronic device, and each of the two plastic gaskets being attached to each of the two securing panels.

4. The testing apparatus of claim 3, wherein each of the two plastic gaskets is rectangle shaped.

5. The testing apparatus of claim 1, wherein the retaining panel is rectangle shaped, and each of the two securing panels is substantially perpendicular to the retaining panel.

6. The testing apparatus of claim 1, wherein the two sliding slots are substantially parallel to each other.

7. The testing apparatus of claim 1, wherein an inner screw thread is defined in each of the two mounting members, and each of the two mounting members is engaged with the screw pole by the inner screw thread.

8. The testing apparatus of claim 1, further comprising a tension meter, and the tension meter comprising a hook, wherein a clipping portion is located on the retaining panel to engage with the hook.

9. A testing apparatus comprising:
a retaining panel; the retaining panel defines two sliding slots;
a screw pole substantially parallel to the retaining panel;
two securing panels moveably attached to the screw pole, and each of the two securing panels being slidably attached to the retaining panel;
a resilient member located between the two securing panels;
two mounting members; each of the two mounting member being engaged with each of the two securing panels; and
two positioning members, each of the two positioning members is attached to each of the two securing panels, the two positioning members are slidably received in the two sliding slots;
wherein the two securing panels are moveable relative to the screw pole to sandwich an electronic device, the resilient member is deformed when each of the two mounting members is engaged with the screw pole to prevent the two securing panels from disengaging from the electronic device.

10. The testing apparatus of claim 9, further two plastic gaskets configured to be adhered to the electronic device, and each of the two plastic gaskets being attached to each of the two securing panels.

11. The testing apparatus of claim 10, wherein each of the two plastic gaskets is rectangle shaped.

12. The testing apparatus of claim 9, wherein the retaining panel is rectangle shaped, and each of the two securing panels is substantially perpendicular to the retaining panel.

13. The testing apparatus of claim 9, wherein the two sliding slots are substantially parallel to each other.

14. The testing apparatus of claim 9, wherein an inner screw thread is defined in each of the two mounting members, and each of the two mounting members is engaged with the screw pole by the inner screw thread.

15. The testing apparatus of claim 9, further comprising a tension meter, and the tension meter comprising a hook, wherein a clipping portion is located on the retaining panel, to engage with the hook.

* * * * *